(12) United States Patent
Rowe

(10) Patent No.: US 7,263,213 B2
(45) Date of Patent: Aug. 28, 2007

(54) METHODS AND SYSTEMS FOR ESTIMATION OF PERSONAL CHARACTERISTICS FROM BIOMETRIC MEASUREMENTS

(75) Inventor: Robert K. Rowe, Corrales, NM (US)

(73) Assignee: Lumidigm, Inc., Albuquerque, NM (US)

( * ) Notice: Subject to any disclaimer, the term of this patent is extended or adjusted under 35 U.S.C. 154(b) by 150 days.

(21) Appl. No.: 11/009,372

(22) Filed: Dec. 9, 2004

(65) Prior Publication Data

US 2005/0185847 A1    Aug. 25, 2005

Related U.S. Application Data

(60) Provisional application No. 60/529,299, filed on Dec. 11, 2003.

(51) Int. Cl.
*G06K 9/00* (2006.01)

(52) U.S. Cl. .................... 382/124; 382/115; 340/5.53; 340/5.83

(58) Field of Classification Search ............... 382/115, 382/124; 340/5.53, 5.83
See application file for complete search history.

(56) References Cited

U.S. PATENT DOCUMENTS

| | | | |
|---|---|---|---|
| 3,508,830 A | 4/1970 | Hopkins et al. | |
| 3,910,701 A | 10/1975 | Henderson et al. | |
| 3,872,443 A | 10/1976 | Ott | |
| 4,035,083 A | 7/1977 | Woodriff et al. | |
| 4,142,797 A | 3/1979 | Astheimer | |
| 4,169,676 A | 10/1979 | Kaiser | |
| 4,260,220 A | 4/1981 | Whitehead | |
| 4,427,889 A | 1/1984 | Muller | |
| 4,537,484 A | 8/1985 | Fowler et al. | |
| 4,598,715 A | 7/1986 | Machler et al. | |
| 4,653,880 A | 3/1987 | Sting et al. | |
| 4,654,530 A | 3/1987 | Dybwad | |
| 4,655,225 A | 4/1987 | Dahne et al. | |
| 4,656,562 A | 4/1987 | Sugino | |
| 4,657,397 A | 4/1987 | Oehler et al. | |
| 4,661,706 A | 4/1987 | Messerschmidt et al. | |
| 4,684,255 A | 8/1987 | Ford | |
| 4,699,149 A * | 10/1987 | Rice ........................ 600/475 |
| 4,712,912 A | 12/1987 | Messerschmidt | |
| 4,730,882 A | 3/1988 | Messerschmidt | |
| 4,787,013 A | 11/1988 | Sugino et al. | |
| 4,787,708 A | 11/1988 | Whitehead | |
| 4,830,496 A | 5/1989 | Young | |

(Continued)

FOREIGN PATENT DOCUMENTS

EP    0 280 418 A1    8/1988

(Continued)

OTHER PUBLICATIONS

Bantle, John P. & Thomas, William, "Glucose Measurement in Patients with Diabetes Mellitus with Dermal Interstitial Fluid," Copyright © 1997 by Mosby-Year Book, Inc., 9 pages.

(Continued)

*Primary Examiner*—Bhavesh M Mehta
*Assistant Examiner*—John B Strege
(74) *Attorney, Agent, or Firm*—Townsend and Townsend and Crew LLP

(57) ABSTRACT

Methods and apparatus are provided for estimating a personal characteristic of an individual. A biometric data measurement is collected from the individual. The personal characteristic is determined by applying an algorithmic relationship between biometric data measurements and values of the personal characteristic derived from application of a multivariate algorithm to previous measurements.

27 Claims, 7 Drawing Sheets

U.S. PATENT DOCUMENTS

| | | |
|---|---|---|
| 4,853,542 A | 8/1989 | Milosevic et al. |
| 4,857,735 A | 8/1989 | Noller |
| 4,859,064 A | 8/1989 | Messerschmidt et al. |
| 4,866,644 A | 9/1989 | Shenk et al. |
| 4,867,557 A | 9/1989 | Takatani et al. |
| 4,882,492 A | 11/1989 | Schlager |
| 4,883,953 A | 11/1989 | Koashi et al. |
| 4,936,680 A | 6/1990 | Henkes et al. |
| 4,944,021 A | 7/1990 | Hoshino et al. |
| 4,975,581 A | 12/1990 | Robinson et al. |
| 5,015,100 A | 5/1991 | Doyle |
| 5,019,715 A | 5/1991 | Sting et al. |
| 5,028,787 A | 7/1991 | Rosenthal et al. |
| 5,051,602 A | 9/1991 | Sting et al. |
| 5,068,536 A | 11/1991 | Rosenthal |
| 5,070,874 A | 12/1991 | Barnes et al. |
| 5,158,082 A | 10/1992 | Jones |
| 5,163,094 A | 11/1992 | Prokoski et al. |
| 5,178,142 A | 1/1993 | Harjunmaa et al. |
| 5,179,951 A | 1/1993 | Knudson |
| 5,204,532 A | 4/1993 | Rosenthal |
| 5,222,495 A | 6/1993 | Clarke et al. |
| 5,222,496 A | 6/1993 | Clarke et al. |
| 5,223,715 A | 6/1993 | Taylor |
| 5,225,678 A | 7/1993 | Messerschmidt |
| 5,230,702 A | 7/1993 | Lindsay et al. |
| 5,237,178 A | 8/1993 | Rosenthal et al. |
| 5,243,546 A | 9/1993 | Maggard |
| 5,257,086 A | 10/1993 | Fateley et al. |
| 5,267,152 A | 11/1993 | Yang et al. |
| 5,268,749 A | 12/1993 | Weber et al. |
| 5,291,560 A | 3/1994 | Daugman |
| 5,299,570 A | 4/1994 | Hatschek |
| 5,303,026 A | 4/1994 | Strobl et al. |
| 5,311,021 A | 5/1994 | Messerschmidt |
| 5,313,941 A | 5/1994 | Braig et al. |
| 5,321,265 A | 6/1994 | Block |
| 5,331,958 A | 7/1994 | Oppenheimer |
| 5,348,003 A | 9/1994 | Caro |
| 5,351,686 A | 10/1994 | Steuer et al. |
| 5,355,880 A | 10/1994 | Thomas et al. |
| 5,360,004 A | 11/1994 | Purdy et al. |
| 5,361,758 A | 11/1994 | Hall et al. |
| 5,366,903 A | 11/1994 | Lundsgaard et al. |
| 5,372,135 A | 12/1994 | Mendelson et al. |
| 5,379,764 A | 1/1995 | Barnes et al. |
| 5,402,778 A | 4/1995 | Chance |
| 5,405,315 A | 4/1995 | Khuri et al. |
| 5,419,321 A | 5/1995 | Evans |
| 5,435,309 A | 7/1995 | Thomas et al. |
| 5,441,053 A | 8/1995 | Lodder et al. |
| 5,452,723 A | 9/1995 | Wu et al. |
| 5,459,317 A | 10/1995 | Small et al. |
| 5,459,677 A | 10/1995 | Kowalski et al. |
| 5,460,177 A | 10/1995 | Purdy et al. |
| 5,483,335 A | 1/1996 | Tobias |
| 5,494,032 A | 2/1996 | Robinson et al. |
| 5,505,726 A | 4/1996 | Meserol |
| 5,507,723 A | 4/1996 | Keshaviah |
| 5,515,847 A | 5/1996 | Braig et al. |
| 5,518,623 A | 5/1996 | Keshaviah et al. |
| 5,523,054 A | 6/1996 | Switalski et al. |
| 5,533,509 A | 7/1996 | Koashi et al. |
| 5,537,208 A | 7/1996 | Bertram et al. |
| 5,539,207 A | 7/1996 | Wong |
| 5,552,997 A | 9/1996 | Massart |
| 5,559,504 A | 9/1996 | Itsumi et al. |
| 5,596,992 A | 1/1997 | Haaland et al. |
| 5,606,164 A | 2/1997 | Price et al. |
| 5,630,413 A | 5/1997 | Thomas et al. |
| 5,636,633 A | 6/1997 | Messerschmidt et al. |
| 5,655,530 A | 8/1997 | Messerschmidt |
| 5,672,864 A | 9/1997 | Kaplan |
| 5,672,875 A | 9/1997 | Block et al. |
| 5,677,762 A | 10/1997 | Ortyn et al. |
| 5,681,273 A | 10/1997 | Brown |
| 5,708,593 A | 1/1998 | Saby et al. |
| 5,719,399 A | 2/1998 | Alfano et al. |
| 5,719,950 A | 2/1998 | Osten et al. |
| 5,724,268 A | 3/1998 | Sodickson et al. |
| 5,737,439 A | 4/1998 | Lapsley et al. |
| 5,743,262 A | 4/1998 | Lepper, Jr. et al. |
| 5,747,806 A | 5/1998 | Khalil |
| 5,750,994 A | 5/1998 | Schlager |
| 5,751,835 A | 5/1998 | Topping et al. |
| 5,761,330 A | 6/1998 | Stoianov et al. |
| 5,782,755 A | 7/1998 | Chance et al. |
| 5,792,050 A | 8/1998 | Alam et al. |
| 5,792,053 A | 8/1998 | Skladnev et al. |
| 5,793,881 A | 8/1998 | Stiver et al. |
| 5,796,858 A | 8/1998 | Zhou et al. |
| 5,808,739 A | 9/1998 | Turner et al. |
| 5,818,048 A | 10/1998 | Sodickson et al. |
| 5,823,951 A | 10/1998 | Messerschmidt et al. |
| 5,828,066 A | 10/1998 | Messerschmidt |
| 5,830,132 A | 11/1998 | Robinson |
| 5,830,133 A | 11/1998 | Osten et al. |
| 5,850,623 A | 12/1998 | Carman, Jr. et al. |
| 5,853,370 A | 12/1998 | Chance et al. |
| 5,857,462 A | 1/1999 | Thomas et al. |
| 5,860,421 A | 1/1999 | Eppstein et al. |
| 5,867,265 A | 2/1999 | Thomas |
| 5,886,347 A | 3/1999 | Inoue et al. |
| 5,902,033 A | 5/1999 | Levis et al. |
| 5,914,780 A | 6/1999 | Turner et al. |
| 5,929,443 A * | 7/1999 | Alfano et al. ............ 250/341.3 |
| 5,933,792 A | 8/1999 | Anderson et al. |
| 5,935,062 A | 8/1999 | Messerschmidt et al. |
| 5,945,676 A | 8/1999 | Khalil |
| 5,949,543 A | 9/1999 | Bleier et al. |
| 5,957,841 A | 9/1999 | Maruo et al. |
| 5,961,449 A | 10/1999 | Toida et al. |
| 5,963,319 A | 10/1999 | Jarvis et al. |
| 5,987,346 A | 11/1999 | Benaron et al. |
| 5,999,637 A | 12/1999 | Toyoda et al. |
| 6,005,722 A | 12/1999 | Butterworth et al. |
| 6,016,435 A | 1/2000 | Maruo et al. |
| 6,025,597 A | 2/2000 | Sterling et al. |
| 6,026,314 A | 2/2000 | Amerov et al. |
| 6,028,773 A | 2/2000 | Hundt |
| 6,031,609 A | 2/2000 | Funk et al. |
| 6,034,370 A | 3/2000 | Messerschmidt |
| 6,040,578 A | 3/2000 | Malin et al. |
| 6,041,247 A | 3/2000 | Weckstrom et al. |
| 6,041,410 A | 3/2000 | Hsu et al. |
| 6,043,492 A | 3/2000 | Lee et al. |
| 6,044,285 A | 3/2000 | Chaiken et al. |
| 6,045,502 A | 4/2000 | Eppstein et al. |
| 6,046,808 A | 4/2000 | Fately |
| 6,049,727 A | 4/2000 | Crothall |
| 6,056,738 A | 5/2000 | Marchitto et al. |
| 6,057,925 A | 5/2000 | Anthon |
| 6,061,581 A | 5/2000 | Alam et al. |
| 6,061,582 A | 5/2000 | Small et al. |
| 6,066,847 A | 5/2000 | Rosenthal |
| 6,069,689 A | 5/2000 | Zeng et al. |
| 6,070,093 A | 5/2000 | Oosta et al. |
| 6,073,037 A | 6/2000 | Alam et al. |
| 6,088,605 A | 7/2000 | Griffith et al. |
| 6,088,607 A | 7/2000 | Diab et al. |
| 6,097,035 A | 8/2000 | Belongie et al. |
| 6,100,811 A | 8/2000 | Hsu et al. |
| 6,115,484 A | 9/2000 | Bowker et al. |
| 6,115,673 A | 9/2000 | Malin et al. |

| | | | |
|---|---|---|---|
| 6,122,042 A | 9/2000 | Wunderman et al. | |
| 6,122,394 A | 9/2000 | Neukermans et al. | |
| 6,122,737 A | 9/2000 | Bjorn et al. | |
| 6,125,192 A | 9/2000 | Bjorn et al. | |
| 6,141,101 A | 10/2000 | Bleier et al. | |
| 6,147,749 A | 11/2000 | Kubo et al. | |
| 6,148,094 A | 11/2000 | Kinsella | |
| 6,152,876 A | 11/2000 | Robinson et al. | |
| 6,154,658 A | 11/2000 | Caci | |
| 6,157,041 A | 12/2000 | Thomas et al. | |
| 6,159,147 A | 12/2000 | Lichter et al. | |
| 6,172,743 B1 | 1/2001 | Kley et al. | |
| 6,175,407 B1 | 1/2001 | Sartor | |
| 6,181,414 B1 | 1/2001 | Raz et al. | |
| 6,181,958 B1 | 1/2001 | Steuer et al. | |
| 6,188,781 B1 | 2/2001 | Brownlee | |
| 6,212,424 B1 | 4/2001 | Robinson | |
| 6,226,541 B1 | 5/2001 | Eppstein et al. | |
| 6,230,034 B1 | 5/2001 | Messerschmidt et al. | |
| 6,240,306 B1 | 5/2001 | Rohrscheib et al. | |
| 6,240,309 B1 | 5/2001 | Yamashita et al. | |
| 6,241,663 B1 | 6/2001 | Wu et al. | |
| 6,256,523 B1 | 7/2001 | Diab et al. | |
| 6,272,367 B1 | 8/2001 | Chance | |
| 6,280,381 B1 | 8/2001 | Malin et al. | |
| 6,282,303 B1 | 8/2001 | Brownlee | |
| 6,285,895 B1 | 9/2001 | Ristolainen et al. | |
| 6,292,576 B1 | 9/2001 | Brownlee | |
| 6,301,375 B1 * | 10/2001 | Choi | 382/115 |
| 6,301,815 B1 | 10/2001 | Sliwa | |
| 6,304,767 B1 | 10/2001 | Soller et al. | |
| 6,307,633 B1 | 10/2001 | Mandella et al. | |
| 6,309,884 B1 | 10/2001 | Cooper et al. | |
| 6,317,507 B1 | 11/2001 | Dolfing | |
| 6,324,310 B1 | 11/2001 | Brownlee | |
| 6,330,346 B1 | 12/2001 | Peterson et al. | |
| 6,404,904 B1 | 6/2002 | Einighammer et al. | |
| 6,419,361 B2 * | 7/2002 | Cabib et al. | 351/221 |
| 6,483,929 B1 | 11/2002 | Murakami et al. | |
| 6,504,614 B1 | 1/2003 | Messerschmidt et al. | |
| 6,560,352 B2 | 5/2003 | Rowe et al. | |
| 6,574,490 B2 | 6/2003 | Abbink et al. | |
| 6,628,809 B1 | 9/2003 | Rowe et al. | |
| 6,741,729 B2 | 5/2004 | Bjorn et al. | |
| 6,799,275 B1 | 9/2004 | Bjorn | |
| 6,799,726 B2 * | 10/2004 | Stockhammer | 235/492 |
| 6,816,605 B2 | 11/2004 | Rowe et al. | |
| 2002/0171834 A1 | 11/2002 | Rowe et al. | |
| 2002/0183624 A1 | 12/2002 | Rowe et al. | |
| 2003/0078504 A1 | 4/2003 | Rowe et al. | |
| 2003/0223621 A1 * | 12/2003 | Rowe et al. | 382/115 |
| 2004/0047493 A1 | 3/2004 | Rowe et al. | |
| 2004/0240712 A1 | 12/2004 | Rowe et al. | |
| 2005/0007582 A1 | 1/2005 | Villers et al. | |
| 2005/0180620 A1 * | 8/2005 | Takiguchi | 382/128 |
| 2005/0205667 A1 | 9/2005 | Rowe | |
| 2005/0265585 A1 | 12/2005 | Rowe | |
| 2005/0265586 A1 | 12/2005 | Rowe et al. | |
| 2005/0271258 A1 | 12/2005 | Rowe | |
| 2006/0002597 A1 | 1/2006 | Rowe | |
| 2006/0002598 A1 | 1/2006 | Rowe et al. | |

FOREIGN PATENT DOCUMENTS

| | | |
|---|---|---|
| EP | 0 897 164 A2 | 2/1999 |
| EP | 0 924 656 A2 | 6/1999 |
| WO | WO92/17765 A1 | 10/1992 |
| WO | WO93/07801 A1 | 4/1993 |
| WO | WO 01/18332 A1 | 3/2001 |
| WO | WO 01/27882 A2 | 4/2001 |
| WO | WO 01/52180 A1 | 7/2001 |
| WO | WO 01/52726 A1 | 7/2001 |
| WO | WO 01/53805 A1 | 7/2001 |
| WO | WO 02/084605 A2 | 10/2002 |
| WO | WO 02/099393 A2 | 12/2002 |
| WO | WO 04/068388 A2 | 8/2004 |
| WO | WO 04/068394 A1 | 8/2004 |

OTHER PUBLICATIONS

Berkoben et al. "Vascular Access for Hemodialysis", Clinical Dialysis, published on or before Oct. 30, 1997, 20 pages.

Bleyer et al., "The costs of Hospitalization Due to Hemodialysis Access Management", Nephrology News & Issues, Jan. 1995, pp. 19, 20 and 22..

Brochure entitled "Determination of Delivered Therapy Through Measurement of Effective Clearance", Fresenius USA, Dec. 1994, 1 page.

Daugirdas et al., "Comparison of Methods to Predict the Equilibrated Kt/V (eKt/V) in the Hemo Study", National Institutes of Health, NIDDK, Bethesda, MD, Aug. 20, 1996.

Demos, S.G. & Alfano, R.R. "Optical fingerprinting using polarisation contrast improvement" Electronics Letters, Mar. 27, 1997, pp. 582-584, vol. 33, No. 7.

Depner et al., "Clinical Measurement of Blood Flow in Hemodialysis Access Fistulae and Grafts by Ultrasound Dilution", from the Department of Nephrology, University of California, published on or before Oct. 30, 1997, 4 pages.

Hakim et al., "Effects of Dose of Dialysis on Morbidity and Mortality", American Journal of Kidney Diseases, vol. 23, No. 5, May 1994, pp. 661-669.

Jacobs, et al., "A Disposable Urea Sensor for Continuous Monitoring of Hemodialysis Efficiency", USAIO Journal, 1993, pp. M353-M358.

Keshaviah et al., "On-line monitoring of the delivery of the hemodialysis prescription", Pediatric Nephrology, vol. 9, 1995, pp. S2-S8.

Krivitski, "Theory and Validation of Access Flow Measurement by Dilution Technique During Hemodialysis", Kidney International, vol. 48, 1995, pp. 244-250.

Marbach, Raif, "Measurement Techniques for IR Spectroscopic Blood Glucose Determination," (1994) pp. 1-158.

Mardia, K.V. et al., Multivariate Analysis, Academic Press (1979) pp. 300-325.

Nichols, et al., "Design and Testing of a White-Light, Steady-State Diffuse Reflectance Spectrometer for Determination of Optical Properties of Highly Scattering Systems," Applied Optics, Jan. 1, 1997, 36(1), pp. 93-104.

Ripley, B.D., Pattern Recognition and Neural Networks, Cambridge University Press (1996) pp. 91-120.

Ronco et al., "On-line urea monitoring: a further step towards adequate dialysis prescription and delivery", Int'l Journal of Artificial Organs, vol. 18, No. 9, 1995, pp. 534-543.

Service, F. John et al., "Dermal Interstitial Glucose as an Indicator of Ambient Glycemia," Diabetes Care, vol. 20, No. 9, Sep. 1997, 9 pages.

Sherman, "Recirculation in the Hemodialysis Access", Principles and Practice of Dialysis, 1994, pp. 38-46.

Sherman, "The Measurement of Dialysis Access Recirculation", American Journal of Kidney Diseases, vol. 22, No. 4, Oct. 1993, pp. 616-621.

Steuer et al., "A New Optical Technique for Monitoring Hematocrit and Circulating Blood Volume: Its Application in Renal Dialysis", Dialysis & Transplantation, vol. 22, No. 5, May 1993, pp. 260-265.

Webb, Paul, "Temperatures of Skin, Subcutaneous Tissue, Muscle and Core in Resting Men in Cold, Comfortable and Hot Conditions," European Journal of Applied Physiology, vol. 64, (1992) pp. 471-476.

Zavala, Albert & Paley, James J. "Using fingerprint measures to predict other anthropometric Variables" Human Factors, 1975, pp. 591-602, vol. 17, No. 6.

* cited by examiner

METHODS AND SYSTEMS FOR ESTIMATION OF PERSONAL CHARACTERISTICS FROM BIOMETRIC MEASUREMENTS

CROSS-REFERENCES TO RELATED APPLICATIONS

This application is a nonprovisional of, and claims the benefit of the filing date of, U.S. Prov. Pat. Appl. No. 60/529,299, entitled "DEMOGRAPHIC INFORMATION ESTIMATION FROM DERMATOGLYPHIC AND OTHER BIOMETRIC PATTERNS," filed Dec. 11, 2003 by Robert K. Rowe, the entire disclosure of which is incorporated herein by reference for all purposes.

This application is related to U.S. patent application Ser. No. 10/818,698, entitled "MULTISPECTRAL BIOMETRIC SENSOR," filed Apr. 5, 2004 by Robert K. Rowe et al., which is a nonprovisional of each of U.S. Prov. Pat. Appl. No. 60/460,247, entitled "NONINVASIVE ALCOHOL MONITOR," filed Apr. 4, 2003; U.S. Prov. Pat. Appl. No. 60/483,281, entitled "HYPERSPECTRAL FINGERPRINT READER," filed Jun. 27, 2003 by Robert K. Rowe et al.; U.S. Prov. Pat. Appl. No. 60/504,594, entitled "HYPERSPECTRAL FINGERPRINTING," filed Sep. 18, 2003; and U.S. Prov. Pat. Appl. No. 60/552,662, entitled "OPTICAL SKIN SENSOR FOR BIOMETRICS," filed Mar. 10, 2004. This application is also related to U.S. patent application Ser. No. 09/874,740, entitled "APPARATUS AND METHOD OF BIOMETRIC DETERMINATION USING SPECIALIZED OPTICAL SPECTROSCOPY SYSTEM," filed Jun. 5, 2001 by Robert K. Rowe et al. and to U.S. patent application Ser. No. 10/640,503, entitled "ELECTRO-OPTICAL SENSOR," filed Aug. 12, 2003 Robert K. Rowe et al. ("the '503 application"). The '503 application is a nonprovisional of U.S. Prov. Pat. Appl. No. 60/403,453, entitled "BIOMETRIC ENROLLMENT SYSTEMS AND METHODS," filed Aug. 13, 2002 by Robert K. Rowe et al.; U.S. Prov. Pat. Appl. No. 60/403,452, entitled "BIOMETRIC CALIBRATION AND DATA ACQUISITION SYSTEMS AND METHODS," filed Aug. 13, 2002 by Robert K. Rowe et al.; U.S. Prov. Pat. Appl. No. 60/403,593, entitled "BIOMETRIC SENSORS ON PORTABLE ELECTRONIC DEVICES," filed Aug. 13, 2002 by Robert K. Rowe et al.; U.S. Prov. Pat. Appl. No. 60/403,461, entitled "ULTRA-HIGH-SECURITY IDENTIFICATION SYSTEMS AND METHODS," filed Aug. 13, 2002 by Robert K. Rowe et al.; U.S. Prov. Pat. Appl. No. 60/403,449, entitled "MULTI-FUNCTION BIOMETRIC DEVICES," filed Aug. 13, 2002 by Robert K. Rowe et al; and U.S. Prov. Pat. Appl. No. 60/460,247, entitled "NONINVASIVE ALCOHOL MONITOR," filed Apr. 4, 2003 by Robert K. Rowe et al. The entire disclosure of each application identified above is incorporated herein by reference for all purposes.

BACKGROUND OF THE INVENTION

This application relates generally to biometrics. More specifically, this application relates to methods and systems for estimating personal characteristics for individuals from biometric measurements, such as by estimating anthropometric, demographic, and/or physiological parameters from fingerprints or other dermatoglyphic images.

The traditional approach of biometric identification systems has been to use a biometric measurement to provide a unique identification of an individual. For example, a biometric such as a fingerprint might be collected at the scene of a crime by law-enforcement personnel and compared with a database of fingerprints to identify potential suspects. This information may then be used by the law-enforcement agencies to search for the identified suspects as part of an investigation, which might also include ascertaining alibis and motives for various suspects to establish an evidentiary basis for prosecution. Other biometric identification systems may seek to confirm the identity of a person attempting to gain access to a secure facility, and the like. In addition to fingerprint measurements, there are a number of other biometric features that may be used for these purposes, including facial- or hand-geometry measurements, iris and retinal scans, and the like.

The usefulness of all such approaches to biometric identification is constrained by the completeness of the database against which comparisons are made. For example, in the context of law enforcement, a fingerprint collected at a crime scene may not have any counterpart in any accessible fingerprint database because the individual committing the crime has not yet had occasion to be fingerprinted. Current systems might record the fingerprint characteristics for evidentiary purposes should a suspect be identified, but are generally not useful in identifying potential suspects when there are no matches to existing databases.

Similar issues may arise in a number of other contexts. For instance, immigration screening in some countries now requires that some or all people presenting themselves at border crossings have their fingerprints measured. If the measured fingerprint matches the record for a known criminal or terrorist, the screening may take appropriate action. Again, such a process is limited by the fact that all existing fingerprint databases are necessarily incomplete. This presents the potential for certain types of spoofing attacks in which a person presents a different fingerprint through use of a prosthetic or other device, exploiting the fact that a significant number of fingerprints that are collected will not have any database counterparts. For instance, a white 30-year-old male whose fingerprints are known to be those of a wanted terrorist might be approved for entry because he fraudulently presents a fingerprint of a black 65-year-old woman simply because the databases have no record of that woman's fingerprints. Even though the screening authority has been provided with valuable biometric information, it is unable to use it effectively.

In some cases, a biometric measuring system may also be able to produce other estimates that are of commercial interest or of personal interest to a user. For example, a biometric that provides information on skin condition may be of use to the cosmetics industry. Similarly, a biometric sensor that estimates physiological parameters such as blood perfusion or hydration may be useful to a consumer during exercise.

There is accordingly a general need in the art for improved biometric analysis that may accommodate such circumstances.

BRIEF SUMMARY OF THE INVENTION

Embodiments of the invention thus provide methods and apparatus for estimating personal characteristics of individuals from biometric measurements. In a first set of embodiments, a method is provided for estimating a continuous personal characteristic of an individual. A biometric data measurement is collected from the individual. The continuous personal characteristic of the individual is determined by applying an algorithmic relationship between biometric data measurements and values of the continuous personal characteristic derived from application of an algorithm to a plurality of biometric data measurements and corresponding collected personal-characteristic values.

In some such embodiments, the biometric data measurement and the plurality of biometric data measurements comprise dermatoglyphic measurements. The biometric data measurement may be collected by illuminating a skin site of the individual with light and receiving light scattered from the skin site so that a multispectral image may be derived from the received light. Examples of the continuous personal characteristic include age, weight, body-mass index, race, ethnicity, and work classification. In one embodiment, the plurality of biometric measurements and the corresponding personal-characteristic values are collected, and the algorithm is applied to derive the algorithmic relationship. In another embodiment, a second personal characteristic is determined by applying a second algorithmic relationship between biometric data measurements and values of the second personal characteristic derived from application of a second algorithm to the plurality of biometric data measurements and corresponding collected second personal-characteristic values. The algorithm may comprise a multivariate algorithm.

In a second set of embodiments, a method is provided for estimating a personal characteristic of an individual. A skin site of the individual is illuminated with light. Light scattered from the skin site is received. A multispectral image is derived from the received light. The personal characteristic of the individual is determined by applying an algorithmic relationship between multispectral images and values of the personal characteristic derived from application of an algorithm to a plurality of multispectral images and corresponding collected personal-characteristic values.

In some such embodiments, the personal characteristic is a binary personal characteristic, while in other such embodiments, the personal characteristic is a continuous personal characteristic. The skin site may be illuminated by generating the light at a plurality of discrete wavelengths as a plurality of quasimonochromatic beams and then directing the generated light to the skin site. Alternatively, the skin site may be illuminated by generating a broadband beam of light and filtering the broadband beam at a plurality of discrete wavelengths, with the filtered broadband beam being directed to the skin site. In some instances, the skin site may be illuminated with light polarized with a first polarization, with the received light being polarized with a second polarization that is substantially crossed relative to the first polarization. In one embodiment, the plurality of multispectral images and the corresponding personal-characteristic values are collected, and the algorithm is applied to derive the algorithmic relationship. In another embodiment, a second personal characteristic is determined by applying a second algorithmic relationship between multispectral images and values of the second personal characteristic derived from application of a second algorithm to the plurality of multispectral images and corresponding collected second personal-characteristic values. The algorithm may comprise a multivariate algorithm.

In a third set of embodiments, a method is provided for estimating a personal characteristic of an individual. A biometric data measurement is collected from the individual. The personal characteristic is determined by applying an algorithmic relationship between biometric data measurements and values of the personal characteristic derived from application of a multivariate algorithm to a plurality of biometric data measurements and corresponding collected personal-characteristic values.

In some instances, the biometric data measurement and the plurality of biometric data measurements comprise dermatoglyphic measurements. In one embodiment, the biometric data are collected by illuminating a skin site of the individual with light and receiving light scattered from the skin site, so that a multispectral image may be derived from the received light.

Certain methods of the invention may be performed with a sensor system having an illumination subsystem, a detection subsystem, and a computational unit interfaced with the detection subsystem. The illumination subsystem is disposed to provide light to a skin site of an individual. The detection subsystem is disposed to receive light from the skin site. The computational unit has instructions to implement certain methods of the invention as described above.

BRIEF DESCRIPTION OF THE DRAWINGS

A further understanding of the nature and advantages of the present invention may be realized by reference to the remaining portions of the specification and the drawings wherein like reference labels are used throughout the several drawings to refer to similar components. In some instances, reference labels include a numerical portion followed by a latin-letter suffix; reference to only the numerical portion of reference labels is intended to refer collectively to all reference labels that have that numerical portion but different latin-letter suffices.

DETAILED DESCRIPTION OF THE INVENTION

1. Overview

Figure 1:
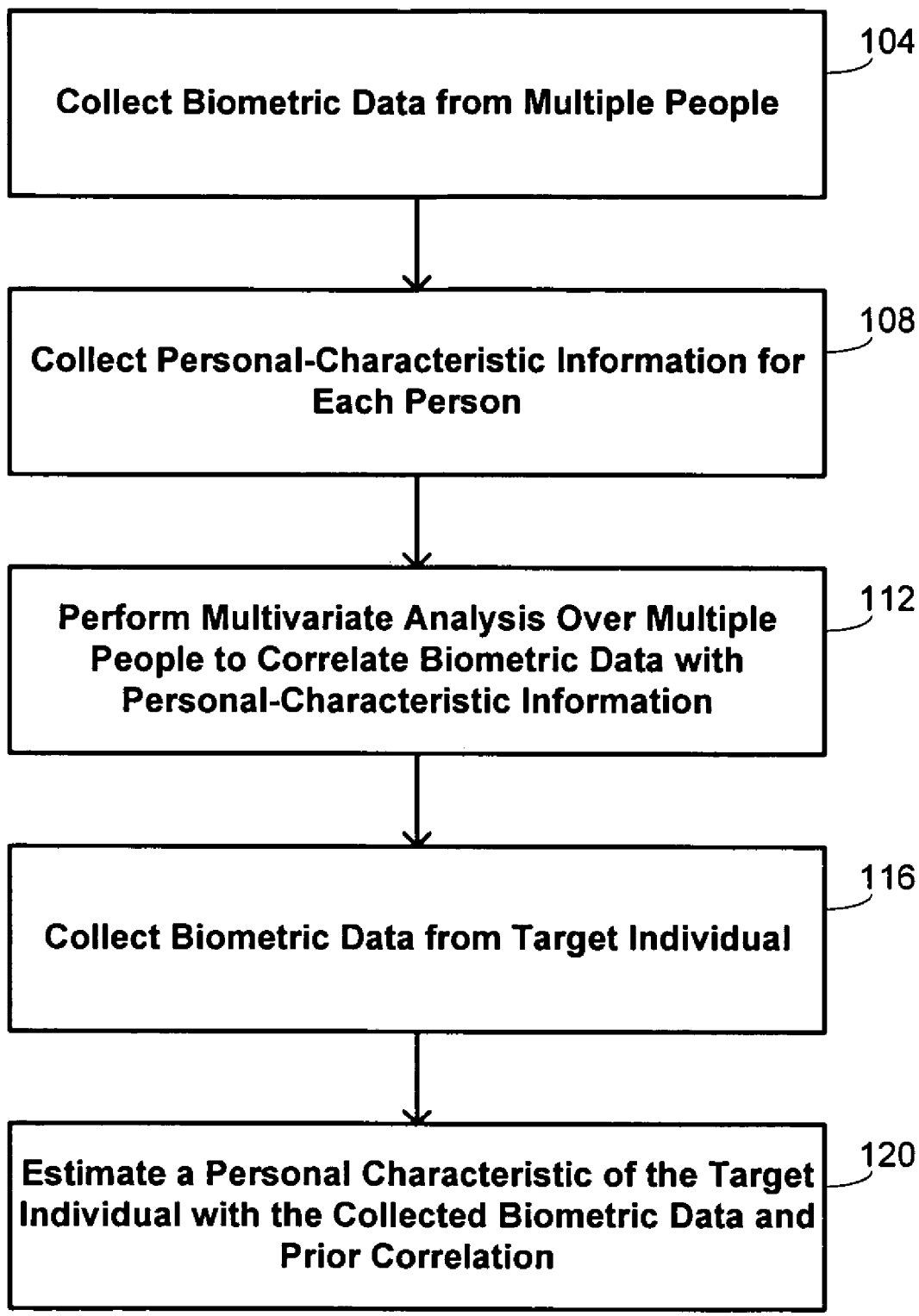
FIG. 1 is a flow diagram illustrating a method for estimating a personal characteristic of an individual in an embodiment of the invention.

Embodiments of the invention make use of correlations between biometric measurements and personal characteristics, enabling a biometric measurement of an unknown individual to be used in estimating a personal characteristic of that individual. As used herein, "personal characteristics" refer specifically to anthropometric, demographic, and/or physiological properties of an individual. "Anthropometric" parameters may include aspects of the individual such as the height, weight, or body mass index, or the "handedness" (i.e. distinguish between prints that were made from fingers on the right hand or on the left hand). "Demographic" parameters may include categories such as age, sex, ethnicity, or work classification. "Physiological" parameters may include categories such as amount and kind of skin pigmentation, skin oil content, skin hydration, degree of perfusion of blood in the skin, and the like. In some instances, reference is made herein to "binary personal-characteristic properties," which are properties that may take one of only two possible states; examples of binary personal-characteristic properties include sex and handedness, for example. Reference is also sometimes made herein to "continuous personal-characteristic properties," which are properties that are generally unconstrained as to value and which may take any value, perhaps within certain endpoint limits; examples of continuous anthropometric properties include age and weight. Some personal-characteristic properties may function in either a binary or continuous fashion depending on the application. For example, an ethnicity property may be defined as a binary personal characteristic in which a person is or is not classifiable as belonging to a specific ethnicity. More commonly, however, a personal characteristic such as ethnicity is treated as a continuous personal characteristic to recognize that there are multiple categorizations possible and that most individuals will present some degree of several categorizations no matter how the categorizations are assigned.

In accordance with embodiments of the invention, biometric patterns may be used to establish certain characteristics of groups being studied. For example, the genetic distance between certain ethnic groups may be estimated by comparing patterns found in biometric measurements. Assessments of this kind may be performed at the level of the genotype (group characteristics) rather than at the phenotype (individual expression of the genotype). Certain genetic diseases such as Down Syndrome also have correlates with certain biometric patterns.

In some embodiments, the biometric patterns that are used comprise dermatoglyphic patterns, which may be collected from skin sites that include fingers, palms, toes, and soles. Suitable methods for acquiring such patterns include optical image capture based on total internal reflectance ("TIR") phenomena, direct optical imaging, capacitive, radio-frequency ("RF") and other semiconductor array capture devices, ultrasound, pressure arrays, and the like. The term "fingerprint" is used broadly herein to refer to any representation of any skin site with dermatoglyphic features. Also, optical capture may be performed in such a way that multiple optical conditions are measured from the same portion of skin. The optical system may comprise a multi-spectral and/or hyperspectral capture device in which multiple illumination wavelengths are used for illumination. The optical system may also make measurements under two or more polarization conditions. Systems that collect images taken under a plurality of optical conditions such as different wavelengths and/or different polarization conditions are examples of "multispectral systems." A detailed description is provided below of an example of a multispectral system that may accordingly be used in embodiments of the invention, but such a description is not intended to be limiting since other techniques may be used in alternative embodiments. Collection of multispectral data is advantageously robust to non-ideal skin qualities, such as dryness, lack of resilience, and/or worn features such as are typically associated with the elderly, those who perform significant manual labor, or those whose skin is exposed to chemicals, such as hairdressers or nurses. Furthermore, such multispectral data may advantageously include additional information useful for performing an estimate of a personal characteristic beyond that provided by alternative fingerprint sensing technologies.

A general overview of methods of the invention is provided with the flow diagram of FIG. 1. The method initially begins by establishing a correlation between a personal characteristic and biometric measurements. This may be done by performing biometric measurements on a plurality of people to collect biometric data, as indicated at block 104. Personal-characteristic information, such as age, sex, handedness, weight, etc. is also collected at block 108. The group of people chosen for such a collection preferably exhibit a broad range of personal-characteristic properties, particularly of continuous personal-characteristic properties, and including extreme values such as a large range of ages, very high and very low weights, and the like. The reliability of the method is generally enhanced with more balanced initial input and by relatively large numbers of measurements used for correlation. In some embodiments, the number of people in the group is greater than 1000.

The collected data are subjected to multivariate analysis over the group of people at block 112 to correlate the biometric data with the anthropometric information. Such analysis may include the application of various preprocessing techniques to reduce the number of features, enhance image quality, and/or achieve other desired characteristics. For example, eigenanalysis may be applied to the collected biometric data to describe each biometric measurement by a set of scores that correspond to a selected number of eigenfeatures. Feature extraction methods may include eigenanalysis, linear discriminant analysis, and the decomposition of the image data into a variety of pre-established basis functions including sines and cosines (frequency analysis), wavelets, Gabor filters, radial basis functions, and others known to one of familiarity in the art. In the specific case where the biometric measurements comprise spectral measurements, the preprocessing techniques may extract such features as bulk spectral characteristics, contrast levels, and the like. In some cases, it may be advantageous to use features that are invariant to certain effects that occur during data collection. For example, under certain conditions, frequency analysis can produce features that are invariant to translation of the object being imaged. In some instances, the use of directly measured data rather than preprocessed data advantageously permits the application of multivariate algorithms to recognize subtle correlations and spatial relationships in patterns that might be obscured through preprocessing applications.

Examples of the multivariate methods that may be applied to the features and/or the raw data to determine correlation with the personal characteristics include such techniques as linear or quadratic discriminant analysis, partial least-squares analysis, principal-component regression and the like. In some instances, application of the multivariate methods may be performed by a trained evaluation system, such as an expert system, a neural network, or the like. The application of the multivariate analysis relates the measured biometric data with the collected anthropometric data to define a correlation relationship. For instance, a set of scores generated from an eigenanalysis of the measured biometric data may be related to a personal characteristic, thereby providing an algorithmic relationship that relates the two. This may be done both for binary anthropometric properties and continuous anthropometric properties. In the case of binary anthropometric properties, such as sex or handedness, the correlation may be established using a quantitative regression technique or a classification technique. Suitable techniques for correlating the biometric measurements with a nonquantitative personal characteristic, such as race, include K-nearest-neighbor techniques and other clustering techniques.

After an algorithmic relationship has been established at block 112, personal-characteristic estimates may be made for biometric measurements not in the correlation set. In the case of continuous personal characteristics such as age and weight, making such estimates may comprise interpolating or extrapolating the correlation model, although generally extrapolations will rarely be needed if the initial biometric-measurement set was balanced. Thus, at block 116, biometric data are collected from a target individual, usually by repeating the same kind of measurement that was performed in establishing the correlation relationship initially. The personal characteristic is accordingly estimated at block 120 by applying the algorithmic relationship established in block 112 to the collected biometric data and/or to the features extracted from the biometric data in the same manner as applied to the correlation dataset.

In some instances, multiple correlation relationships may be derived from a single set of collected biometric data, with each establishing a different algorithmic relationship from the measured data to a different personal characteristic. For instance, when the initial set of people includes people with a range of ages, different sexes, different races, different weights, etc. different algorithmic relationships may be established with respect to those different properties. The existence of such correlations permits multiple personal characteristics of the target individual to be estimated at block 120 from the measurement performed at block 116.

Figure 2:
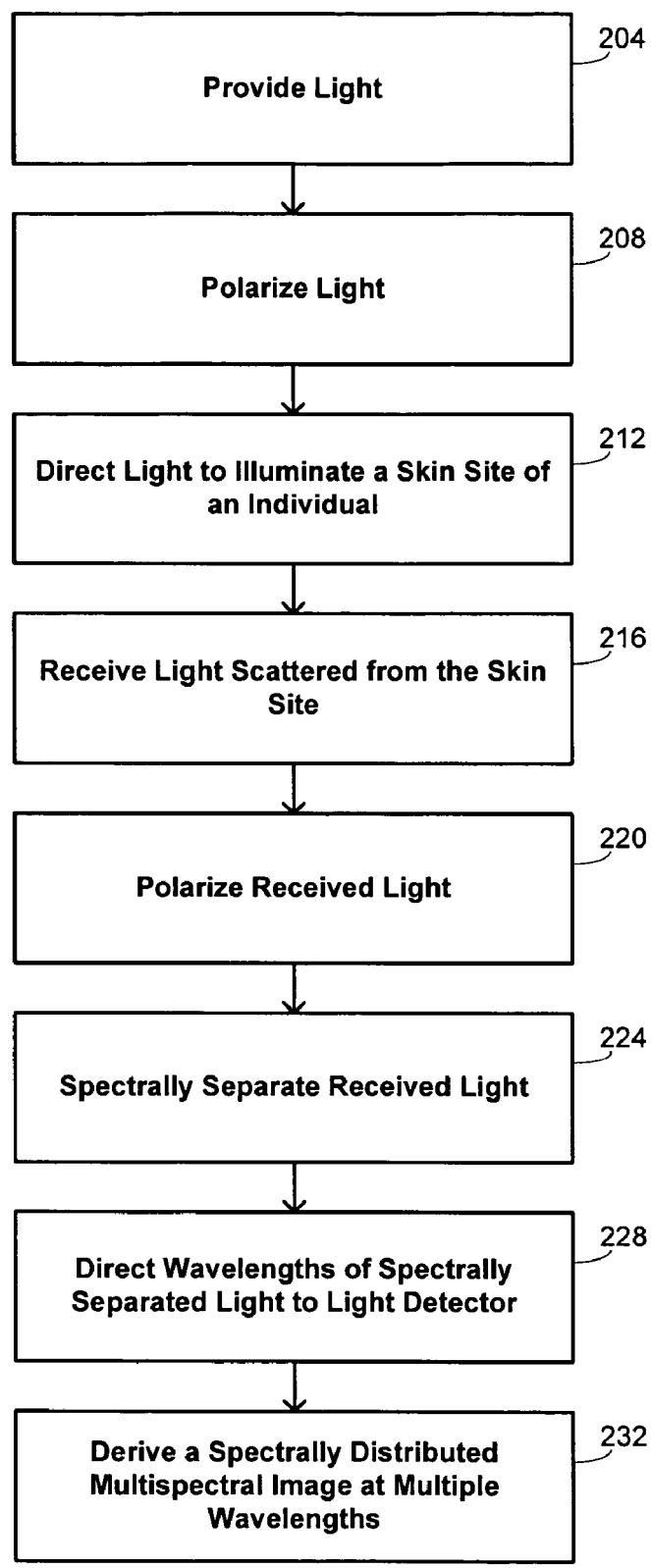
FIG. 2 is a flow diagram illustrating a method for collecting a biometric measurement that may be used with the method of FIG. 1.

A general overview of how biometric data may be collected at block 104 for multiple individuals or at block 116 for a target individual is provided with the flow diagram of FIG. 2 for those embodiments where the biometric data are collected as multispectral data from a skin site of the individual. At block 204, light that may have multiple wavelengths is provided, and may be polarized at block 208. The illumination light is directed to illuminate the individual's skin site at block 212. Light scattered from the skin site is received at block 216 and may be polarized at block 220. The scattered light may generally include reflected and/or transmitted light, perhaps depending on the thickness of tissue at the skin site. The received light may be spectrally separated at block 224 in the case where the light provided at block 204 comprises multiple wavelengths so that different wavelengths may be directed to a light detector at block 228. The light collected at the light detector is then used to derive a multispectral image that may be used for correlation or estimation of personal characteristics as described above.

In general, if the illumination light does not undergo polarization at block 208, a significant portion of the light detected will comprise optical energy that was reflected by the surface of the skin or at very shallow depths into the skin. In contrast, if a polarizer is used to polarize the light at block 208 and a second, orthogonal polarizer is applied at block 220, then the light detected is substantially due to optical interactions below the surface of the skin. Such orthogonal polarization systems may comprise two linear polarizers oriented so that the axes of the two polarizers are separated by approximately 90°. The polarizers may alternatively be circular polarizers in which the orthogonality is achieved by having two circular polarizers of opposite sense (i.e. right hand and left hand). Due to the effect of the polarizers, multiple different images can be collected by changing the polarization state of the system, even when the same illumination wavelength is being used.

In certain instances, the desired information is contained in just a portion of the entire multispectral datacube. For example, estimation of a uniformly distributed, spectrally active compound may require just the measured spectral characteristics, which can be extracted from the overall multispectral datacube. In such cases, the overall system design may be simplified to reduce or eliminate the spatial component of the collected data by reducing the number of image pixels, even to a limit of a single pixel. Thus, while the systems and methods disclosed are generally described in the context of multispectral imaging, it will be recognized that the invention encompasses similar measurements in which the degree of imaging is greatly reduced, even to the point where there is a single detector element.

2. Multispectral Biometric Sensors

Figure 3:
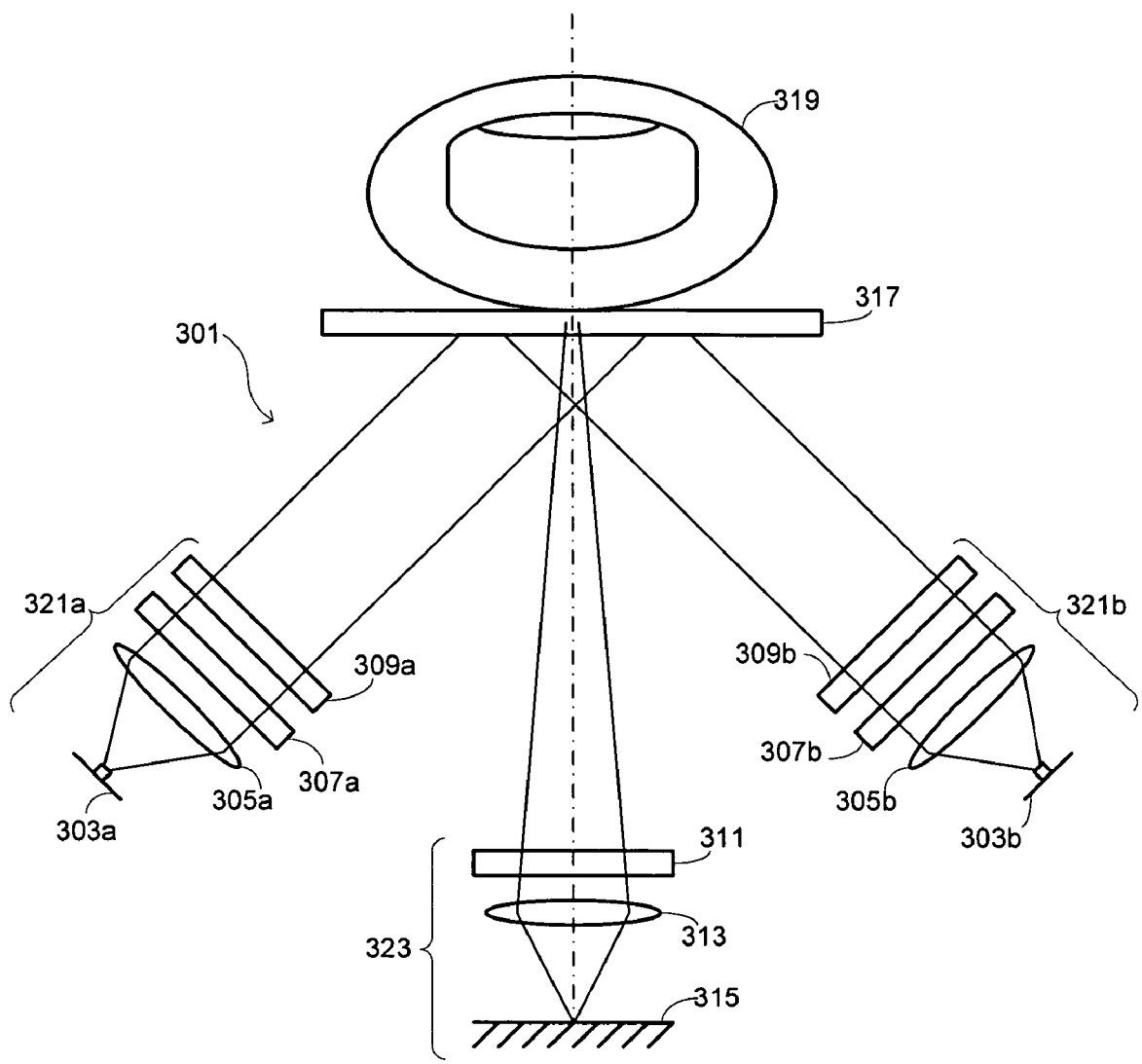
FIG. 3 provides a front view of a multispectral biometric sensor used in an embodiment of the invention.

One structure for a multispectral sensor that may be used to collect biometric data is depicted with the schematic diagram of FIG. 3. The multispectral sensor 301 comprises an illumination subsystem 321 having one or more light sources 303 and a detection subsystem 323 with an imager 315. The figure depicts an embodiment in which the illumination subsystem 321 comprises a plurality of illumination subsystems 321*a* and 321*b*, but the invention is not limited by the number of illumination or detection subsystems 321 or 323. For example, the number of illumination subsystems 321 may conveniently be selected to achieve certain levels of illumination, to meet packaging requirements, and to meet other structural constraints of the multispectral biometric sensor 301. As another example, there may be multiple detection subsystems 323 arranged in different ways and, in particular, to incorporate different optical effects such as total internal reflectance in one or more of the subsystems. Illumination light passes from the source 303 through illumination optics 305 that shape the illumination to a desired form, such as in the form of flood light, light lines, light points, and the like. The illumination optics 305 are shown for convenience as consisting of a lens but may more generally include any combination of one or more lenses, one or more mirrors, and/or other optical elements. The illumination optics 305 may also comprise a scanner mechanism (not shown) to scan the illumination light in a specified one-dimensional or two-dimensional pattern. The light source 303 may comprise a point source, a line source, an area source, or may comprise a series of such sources in different embodiments. In one embodiment, the illumination light is provided as polarized light, such as by disposing a linear polarizer 307 through which the light passes before striking a finger 319 or other skin site of the person being studied.

In some instances, the light source 303 may comprise one or more quasimonochromatic sources in which the light is provided over a narrow wavelength band. Such quasimonochromatic sources may include such devices as light-emitting diodes, laser diodes, or quantum-dot lasers. Alternatively, the light source 303 may comprise a broadband source such as in incandescent bulb or glow bar. In the case of a broadband source, the illumination light may pass through a bandpass filter 309 to narrow the spectral width of the illumination light. In one embodiment, the bandpass filter 309 comprises one or more discrete optical bandpass filters. In another embodiment, the bandpass filter 309 comprises a continuously variable filter that moves rotationally or linearly (or with a combination of rotational and linear movement) to change the wavelength of illumination light. In still another embodiment, the bandpass filter 309 comprises a tunable filter element such as a liquid-crystal tunable filter, an acousto-optical tunable filter, a tunable Fabry-Perot filter or other filter mechanism known to one knowledgeable in the art.

After the light from the light source 303 passes through the illumination optics 305, and optionally the optical filter 309 and/or polarizer 307, it passes through a platen 317 and illuminates the finger 319 or other skin site. The sensor layout and components may advantageously be selected to minimize the direct reflection of the illumination into the detection optics 313. In one embodiment, such direct reflections are reduced by relatively orienting the illumination subsystem 321 and detection subsystem 323 such that the amount of directly reflected light detected is minimized. For instance, the optical axes of the illumination subsystem 321 and the detection subsystem 323 may be placed at angles such that a mirror placed on the platen 317 does not direct an appreciable amount of illumination light into the detection subsystem 323. In addition, the optical axes of the illumination and detection subsystems 321 and 323 may be placed at angles relative to the platen 317 such that the angular acceptance of both subsystems is less than the critical angle of the system; such a configuration avoids appreciable effects due to TIR between the platen 317 and the skin site 319.

An alternative mechanism for reducing the directly reflected light makes use of optical polarizers. Both linear and circular polarizers can be employed advantageously to make the optical measurement more sensitive to certain skin depths, as known to one familiar in the art. In the embodiment illustrated in FIG. 3, the illumination light is polarized by linear polarizer 307. The detection subsystem 323 may then also include a linear polarizer 311 that is arranged with its optical axis substantially orthogonal to the illumination polarizer 307. In this way, light from the sample must undergo multiple scattering events to significantly change its state of polarization. Such events occur when the light penetrates the surface of the skin and is scattered back to the detection subsystem 323 after many scatter events. In this way, surface reflections at the interface between the platen 317 and the skin site 319 are reduced.

The detection subsystem 323 may incorporate detection optics that comprise lenses, mirrors, and/or other optical elements that form an image of the region near the platen surface 317 onto the detector 315. The detection optics 313 may also comprise a scanning mechanism (not shown) to relay portions of the platen region onto the detector 315 in sequence. In all cases, the detection subsystem 323 is configured to be sensitive to light that has penetrated the surface of the skin and undergone optical scattering within the skin and/or underlying tissue before exiting the skin. In some cases, the light source 303 may be a broadband light source used with out a spectral filter 309 is the illumination subsystem. Instead, a color filter array comprising a microarray of different bandpass filters may be incorporated directly on the image array 315. A specific a common color filter array that is present on many color imaging chips is a Bayer filter, which describes an arrangement of red, green, and blue passband filters, as known to one knowledgeable in the art.

As discussed above, it may be advantageous to measure images taken under different polarization conditions. An example of a way to do this can be seen by referring to the two illumination subsystems 312a and 312b. In this embodiment, one illumination subsystem 321a incorporates a linear polarizer 307a in a crossed polarization condition relative to the detection polarizer 311. A second illumination subsystem 321b omits the linear polarizer 307b. In this configuration, a first image may be collected with the polarized illumination subsystem 321a, which will substantially represent optical scatter and other effects below the surface of the skin 319. A second image may then be collected with the unpolarized illumination subsystem 321b. Although a polarizer 311 is in place in the detection subsystem 323, the illumination light in this second image is not polarized and the resulting image will be due in part to surface reflections and very shallow scattering of light as well as from deeper scattering of light from the finger 319. The combination of the two images may be used to provide additional useful information in the estimation of personal characteristics.

The illumination subsystem 321 and detection subsystem 323 may be configured to operate in a variety of optical regimes and at a variety of wavelengths. One embodiment uses light sources 303 that emit light substantially in the region of 400-1000 nm; in this case, the detector 315 may be based on silicon detector elements or other detector material known to those of skill in the art as sensitive to light at such wavelengths. In another embodiment, the light sources 303 may emit radiation at wavelengths that include the near-infrared regime of 1.0-2.5 µm, in which case the detector 315 may comprise elements made from InGaAs, InSb, PbS, MCT, and other materials known to those of skill in the art as sensitive to light at such wavelengths.

Figure 4A:
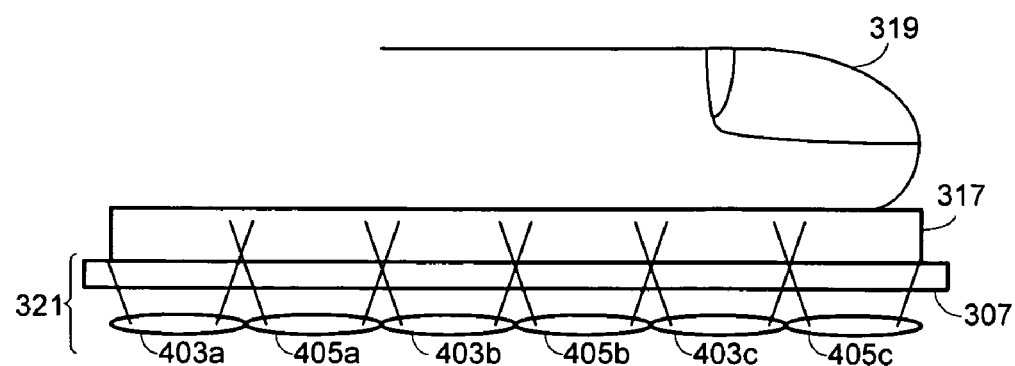
FIG. 4A provides a side view of a multispectral biometric sensor shown in one embodiment.

A side view of one of the embodiments of the invention is shown with the schematic drawing provided in FIG. 4A. For clarity, this view does not show the detection subsystem, but does show an illumination subsystem 321 explicitly. The illumination subsystem 321 in this embodiment includes two discrete light sources 403 and 405 that have different wavelength characteristics. For example, the light sources 403 and 405 may be quasimonochromatic sources such as LEDs, which do not require an optical filter. Sources 403a, 403b, and 403c may provide illumination with substantially the same first wavelength while sources 405a, 405b, and 405c may provide illumination with substantially the same second wavelength, different from the first wavelength. As shown, the illumination optics in FIG. 4A are configured to provide flood illumination, but in alternative embodiments could be arranged to provide line, point, or other patterned illumination by incorporation of cylindrical optics, focusing optics, or other optical components as known to those knowledgeable in the art. As noted earlier, the polarizer 307 may be present over all light sources 403, 405, may be present over a portion of the light sources 403, 405, or may be omitted entirely.

An exemplary measurement sequence for the system shown in FIG. 4A comprising activating the first light sources 403 and collecting a resulting image. After the image is acquired, the first light sources 403 are turned off and the second light sources 405 are activated at a different wavelength, and a resulting image is collected. For a sensor having more than one wavelength of light source, this illumination-measurement sequence may be repeated for all the different wavelengths used in the sensor. It will also be appreciated that substantially the same sequence may be used in embodiments in which the wavelength characteristics of light are determined by states of tunable optical filters, variable optical filters, moveable discrete optical filters, and the like. Alternatively, light sources of different wavelengths 403, 405 may be turned on simultaneously if the detector array 315 includes a color filter array. Another alternative mechanism for collecting images at multiple wavelengths may incorporate an encoding method to identify light of each wavelength when multiple wavelengths are illuminated at a given time. The data from the entire illumination sequence is then collected in such a way that the individual wavelength responses are determined from the encoding using methods known to those of skill in the art. Illumination techniques thus include round-robin, frequency-division modulation, Hadamard encoding, and others.

The sequence of illumination of the light sources may be changed from measurement to measurement. This variability may be introduced to thwart replay attacks where a set of valid signals is recorded and replayed at a later time to defeat the biometric sensor. The measurement variability from sample to sample may also extend in some embodiments to using only a subset of available illumination wavelengths, which are then compared with the corresponding subset of data in an enrollment dataset.

The array of light sources 403 and 405 need not actually be planar as shown in FIG. 4A. For example, in other embodiments, optical fibers, fiber bundles, or fiber optical faceplates or tapers could convey the light from the light sources at some convenient locations to an illumination plane, where light is reimaged onto the finger. The light sources could be controlled by turning the drive currents on and off as LEDs might be. Alternatively, if an incandescent source is used, rapid switching of the light may be accomplished using some form of spatial light modulator such as a liquid crystal modulator or using microelectromechanical-systems ("MEMS") technology to control apertures, mirrors, or other such optical elements.

Figure 4B:
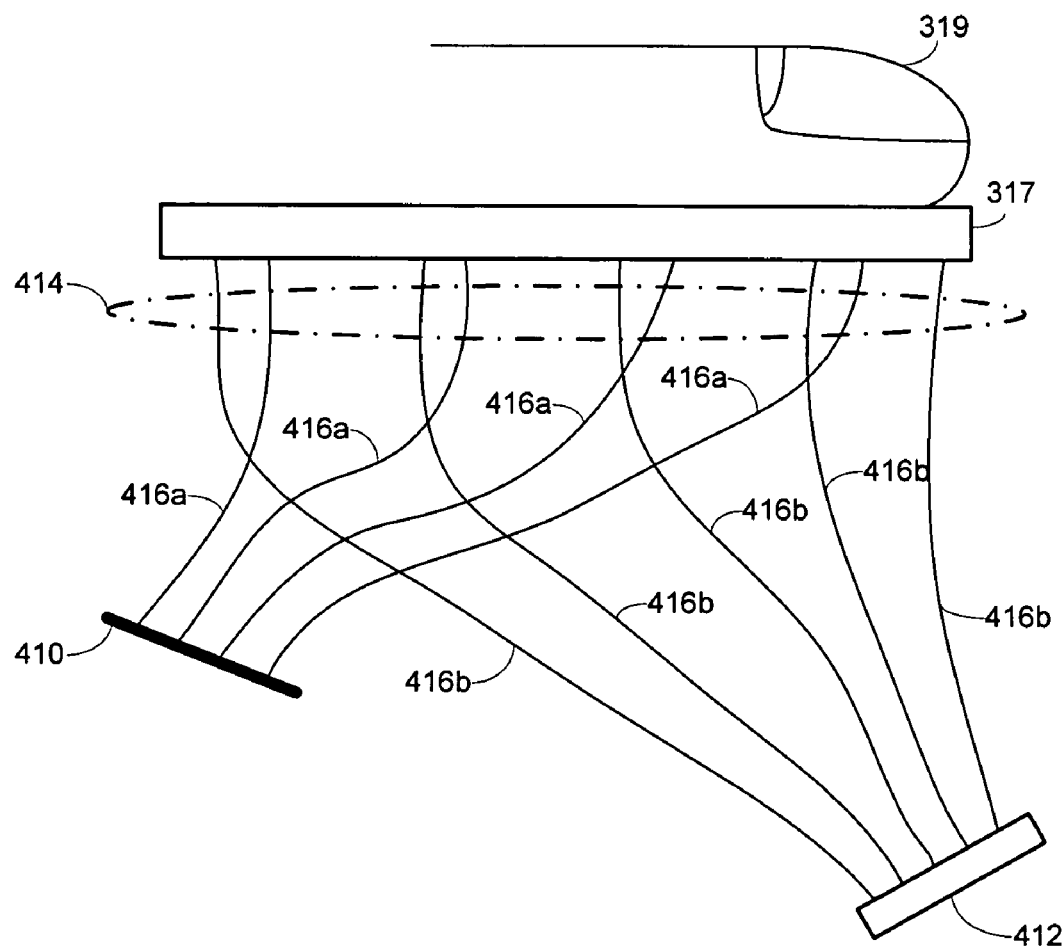
FIG. 4B provides a side view of a multispectral biometric sensor shown in another embodiment.

The use of optical components such as optical fibers and fiber bundles may allow the structure of the multispectral biometric sensor to be simplified. One embodiment is illustrated in FIG. 4B, which shows the use of optical fibers and electronic scanning of illumination sources such as LEDs. Individual fibers 416a connect each of the LEDs located at an illumination array 410 to an imaging surface, and other fibers 416b relay the reflected light back to the imaging device 412, which may comprise a photodiode array or CCD array. The set of fibers 416a and 416b thus defines an optical fiber bundle 414 used in relaying light.

Figure 5:
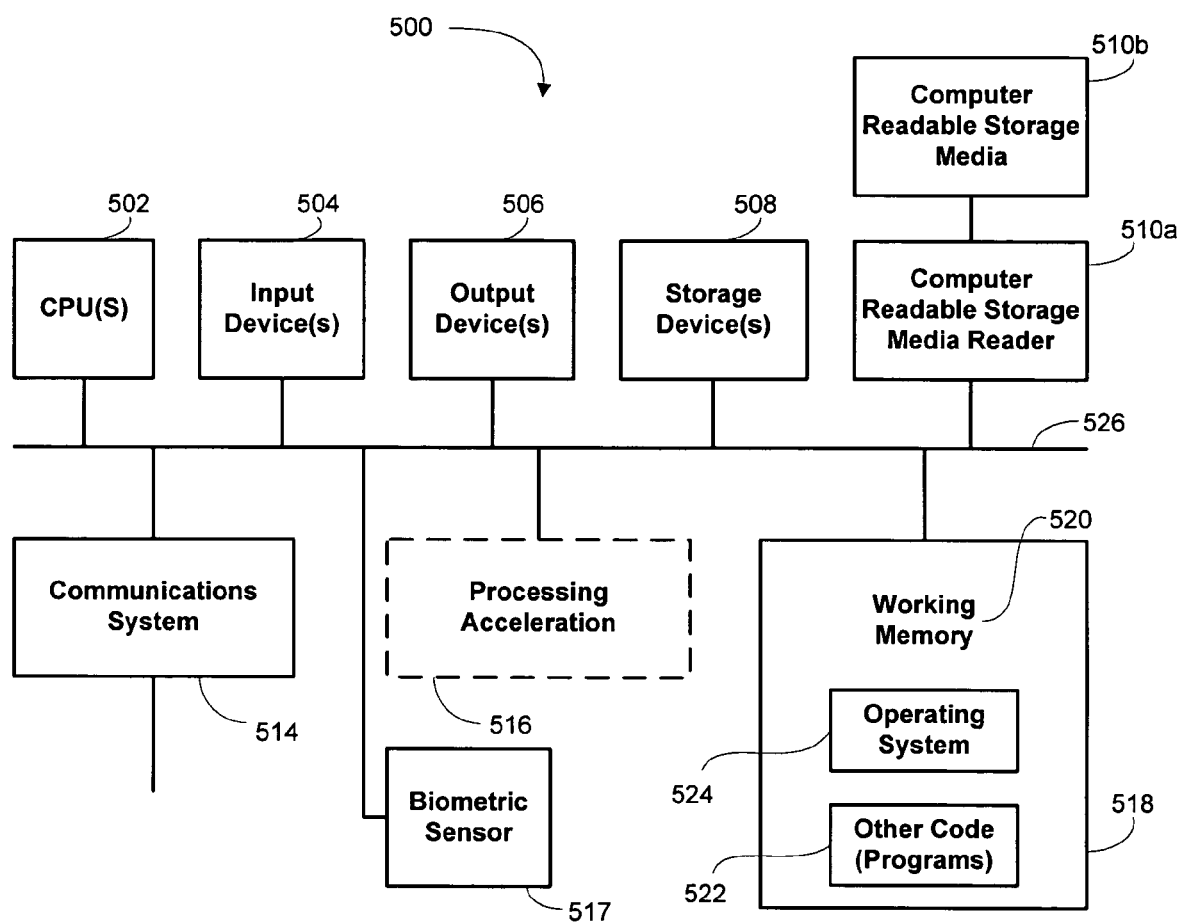
FIG. 5 provides a schematic representation of a computer system that may be used to manage functionality of a personal-characteristic estimation system in one embodiment.

Implementation of the methods described in connection with FIGS. 1 and 2 may be coordinate with a computer system connected with or integrated with a biometric sensor like one of the multispectral biometric sensors described in connection with FIGS. 3-4B. The arrangement shown in FIG. 5 includes a number of components that may be appropriate for a larger system; smaller systems that are integrated with portable devices may use fewer of the components. FIG. 5 broadly illustrates how individual system elements may be implemented in a separated or more integrated manner. The computational device 500 is shown comprised of hardware elements that are electrically coupled via bus 526, which is also coupled with a biometric sensor 517. In some instances, the biometric sensor 517 comprises a multispectral biometric sensor, but this is not required and the biometric sensor 517 may be another type of fingerprint sensor or other biometric sensor in other embodiments. The hardware elements include a processor 502, an input device 504, an output device 506, a storage device 508, a computer-readable storage media reader 510a, a communications system 514, a processing acceleration unit 516 such as a DSP or special-purpose processor, and a memory 518. The computer-readable storage media reader 510a is further connected to a computer-readable storage medium 510b, the combination comprehensively representing remote, local, fixed, and/or removable storage devices plus storage media for temporarily and/or more permanently containing computer-readable information. The communications system 514 may comprise a wired, wireless, modem, and/or other type of interfacing connection and permits data to be exchanged with external devices.

The computational device 500 also comprises software elements, shown as being currently located within working memory 520, including an operating system 524 and other code 522, such as a program designed to implement methods of the invention. It will be apparent to those skilled in the art that substantial variations may be used in accordance with specific requirements. For example, customized hardware might also be used and/or particular elements might be implemented in hardware, software (including portable software, such as applets), or both. Further, connection to other computing devices such as network input/output devices may be employed.

Figure 6:
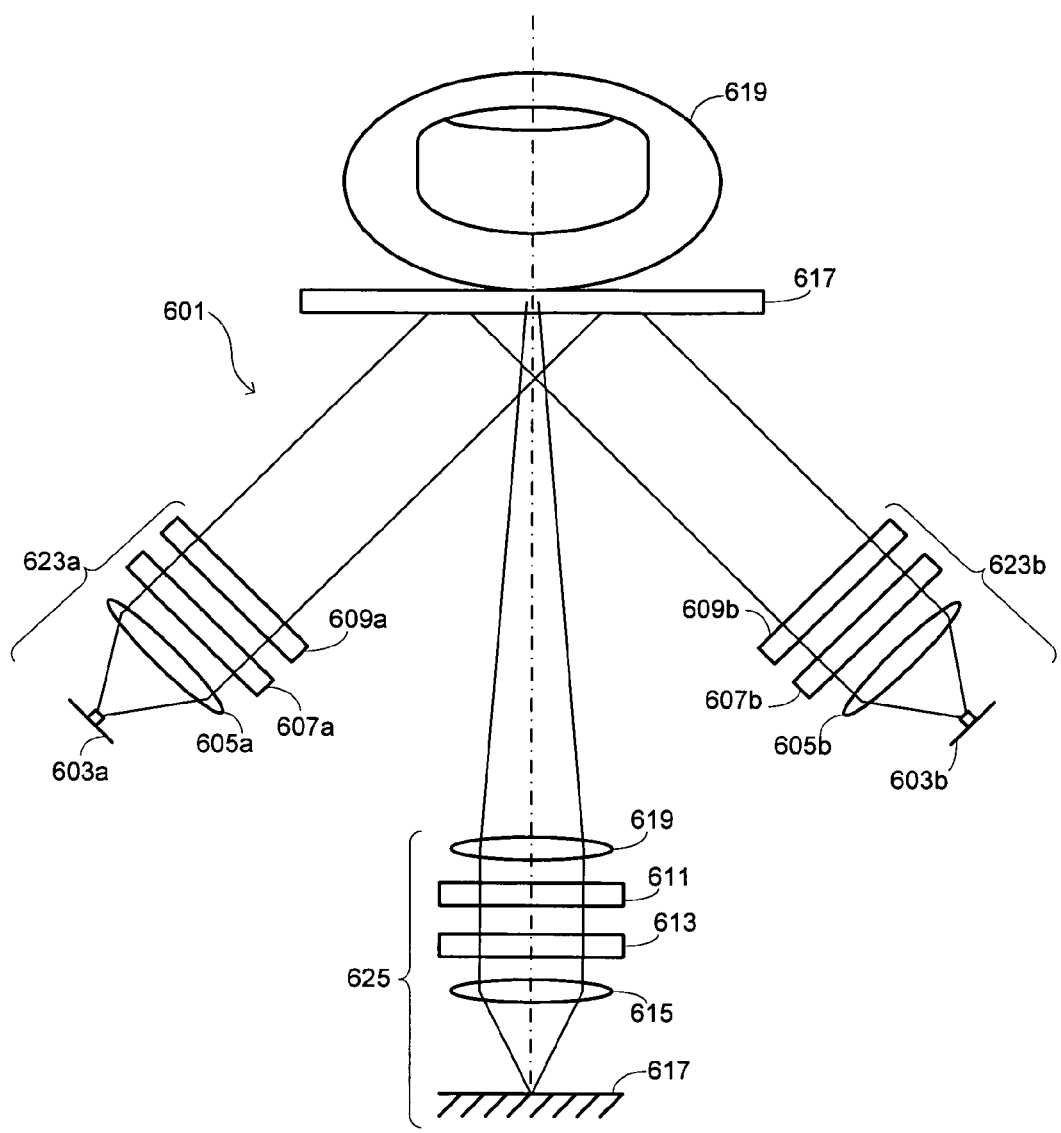
FIG. 6 provides a front view of a computer tomographic imaging spectrometer ("CTIS") in one embodiment of the invention.

Another structure that may be used to implement a multispectral biometric sensor is shown schematically with the front view of FIG. 6. In this embodiment, the multispectral biometric sensor 601 comprises a broadband illumination subsystem 623 and a detection subsystem 625. As for the embodiment described in connection with FIG. 3, there may be multiple illumination subsystems 623 in some embodiments, with FIG. 6 showing a specific embodiment having two illumination subsystems 623. A light source 603 comprised by the illumination subsystem 623 is a broadband illumination source such as an incandescent bulb or a glowbar, or may be any other broadband illumination source known to those of skill in the art. Light from the light source 603 passes through illumination optics 605 and a linear polarizer 607, and may optionally pass through a bandpass filter 609 used to limit the wavelengths of light over a certain region. The light passes through a platen 117 and into a skin site 119. A portion of the light is diffusely reflected from the skin 119 into the detection subsystem 625, which comprises imaging optics 615 and 619, a crossed linear polarizer 611, and a dispersive optical element 613. The dispersive element 613 may comprise a one- or two-dimensional grating, which may be transmissive or reflective, a prism, or any other optical component known in the art to cause a deviation of the path of light as a function of the light's wavelength. In the illustrated embodiment, the first imaging optics 619 acts to collimate light reflected from the skin 619 for transmission through the crossed linear polarizer 611 and dispersive element 613. Spectral components of the light are angularly separated by the dispersive element 613 and are separately focused by the second imaging optics 615 onto a detector 617. As discussed in connection with FIG. 3, the polarizers 607 and 611 respectively comprised by the illumination and detection subsystems 623 and 625 act to reduce the detection of directly reflected light at the detector 617.

The multispectral image generated from light received at the detector is thus a "coded" image in the manner of a computer tomographic imaging spectrometer ("CTIS"). Both wavelength and spatial information are simultaneously present in the resulting image. The individual spectral patterns may be obtained by mathematical inversion or "reconstruction" of the coded image.

Figure 7:
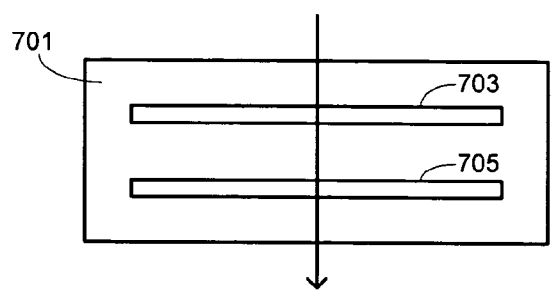
FIG. 7 provides a top view of a swipe sensor in an embodiment of the invention.

The embodiments described above in connection with FIGS. 3 and 6 are examples of "area" sensor configurations. In addition to such area sensor configurations, multispectral imaging sensors may be configured as "swipe" sensors in some embodiments. One example of a swipe sensor is shown in top view with the schematic illustration of FIG. 7. In this figure, the illumination region 703 and detection region 705 of a sensor 701 are substantially collinear. In some embodiments of a swipe sensor 701, there may be more than a single illumination region. For example, there may be a plurality of illumination regions arranged on either side of the detection region 705. In some embodiments, the illumination region 703 may partially or fully overlap the detection region 705. The multispectral image data are collected with the sensor 701 by swiping a finger or other body part across the optically active region, as indicated by the arrow in FIG. 7. The corresponding linear sensor may be a stationary system or a roller system that may further include an encoder to record the position information and aid in stitching a full two-dimensional image from a resulting series of image slices as known to one knowledgeable in the art. When the roller system is used, a fingertip or other skin site may be rolled over a roller that is transparent to the wavelengths of light used. The light is then sequentially received from discrete portions of the skin site, with the multispectral image being built up from light received from the different portions.

The polarizers included with some embodiments may also be used to create or further accentuate the surface features. For instance, if the illumination light is polarized in a direction parallel ("P") with the sampling platen and the detection subsystem incorporates a polarizer in a perpendicular orientation ("S"), then the reflected light is blocked by as much as the extinction ratio of the polarizer pair. However, light that crosses into the fingertip at a ridge point is optically scattered, which effectively randomizes the polarization. This allows a portion, on the order of 50%, of the absorbed and re-emitted light to be observed by the S-polarized imaging system.

The systems described in connection with the specific embodiments above are illustrative and are not intended to be limiting. There are numerous variations and alternatives to the exemplary embodiments described above that are also within the intended scope of the invention. In many instances, the layout or order of the optical components may be changed without substantially affecting functional aspects of the invention. For example, in embodiments that use broadband illumination sources and one or more optical filters, the filter(s) may be located at any of a variety of points in both the illumination and detection subsystems. Also, while the figures show the finger or other skin site from which measurements are made being in contact with the platen, it will be evident that substantially the same measurements may be made without such contact. In such instances, the optical systems for illumination and detection may be configured to illuminate and image the skin site at a distance. Some examples of such systems are provided in U.S. Prov. Pat. Appl. No. 60/552,662, entitled "OPTICAL SKIN SENSOR FOR BIOMETRICS," filed Mar. 10, 2004, which has been incorporated by reference.

Figure 8:
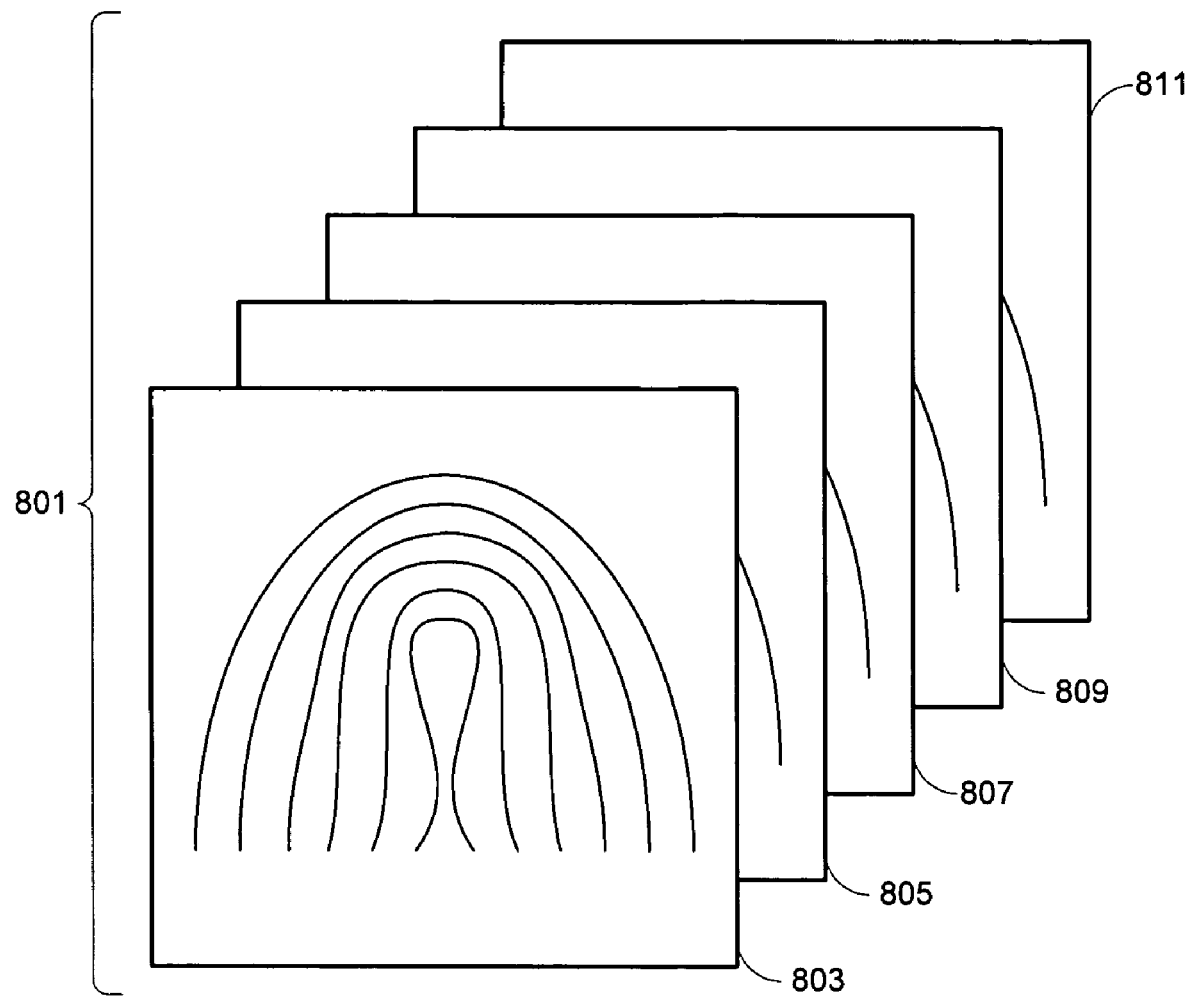
FIG. 8 illustrates a multispectral datacube generated in accordance with embodiments of the invention.

The embodiments described above produce a set of images of the skin site at different wavelengths and/or polarization conditions, or produce data from which such a set may be produced using reconstruction techniques, such as in the particular case of the CTIS or encoded illumination subsystems. For purposes of illustration, the following discussion is made with reference to such a set of spectral images, although it in not necessary to produce them for subsequent biometric processing in those embodiments that do not generate them directly. An illustrative set of multispectral images is shown in FIG. 8, with the set defining a multispectral datacube 801.

One way to decompose the datacube 801 is into images that correspond to each of the wavelengths and/or polarization conditions used in illuminating the sample in the measurement process. In the figure, five separate images 803, 805, 807, 809, and 811 are shown, corresponding to five discrete illumination wavelengths and/or illumination conditions (e.g. illumination point source at position X, Y; illumination polarization present/absent). In an embodiment where visible light is used, the images might correspond, for example, to images generated using light at 450 nm, 500 nm, 550 nm, 600 nm, and 650 nm. Each image represents the optical effects of light of a particular wavelength interacting with skin and, in the case of embodiments where the skin is in contact with a platen during measurement, represents the combined optical effects of light of a particular wavelength interacting with skin and also passing through the skin-platen interface. Due to the optical properties of skin and skin components that vary by wavelength, each of the multispectral images 803, 805, 807, 809, and 811 will be, in general, different from the others. For example, wavelengths shorter than approximately 600 nm are strongly absorbed by blood with peak absorbances at approximately 540 and 576 nm. Images at these wavelengths show blood features strongly, including blanching of the finger as it is pressed against the sensor surface, and a mottled pattern due in part to deeper blood vessels. Light sources of wavelengths longer than approximately 600 nm are less sensitive to blood and are much more smooth and uniform in nature.

The datacube may thus be expressed as $R(X_S, Y_S, X_I, Y_I, \lambda)$ and describes the amount of diffusely reflected light of wavelength $\lambda$ seen at each image point $X_I, Y_I$ when illuminated at a source point $X_S, Y_S$. Different illumination configurations (flood, line, etc.) can be summarized by summing the point response over appropriate source point locations. A conventional non-TIR fingerprint image $F(X_I, Y_I)$ can loosely be described as the multispectral data cube for a given wavelength, $\lambda_0$, and summed over all source positions:

$$F(X_I, Y_I) = \sum_{Y_S} \sum_{X_S} R(X_S, Y_S, X_I, Y_I, \lambda_0).$$

Conversely, the spectral biometric dataset $S(\lambda)$ relates the measured light intensity for a given wavelength $\lambda$ to the difference $\vec{D}$ between the illumination and detection locations:

$$S(\vec{D},\lambda)=R(X_I-X_S,Y_I-Y_S,\lambda).$$

The multispectral datacube R is thus related to both conventional fingerprint images and to spectral biometric datasets. The multispectral datacube R is a superset of either of the other two data sets and contains correlations and other information that may be lost in either of the two separate modalities.

The optical interactions at the skin-platen interface will be substantially the same at all wavelengths since the optical index of refraction of the platen material and the skin are not generally significantly different over the range of wavelengths used and the optical interface does not change substantially during the measurement interval. Light migrated from the skin to the platen, as well as from the platen to the skin, will be affected by Fresnel reflections at the optical interfaces. Thus, light that traverses an air gap will be less intense in the receiving medium than light that does not cross an air gap. This phenomenon forms just one portion of the image information that is contained in the multispectral datacube.

The multispectral image datacube contains spatio-spectral information from multiple sources. Merely by way of example, for the case of a measurement taken on the fingertip in contact with a platen, the resulting datacube contains effects due to: (i) the optical interface between the fingertip and the platen, similar to information contained in a conventional non-TIR fingerprint; (ii) the overall spectral characteristics of the tissue, which are distinct from person to person; (iii) the blood vessels close to the surface of the skin, and especially the capillaries that lie directly below the friction ridges that make up the external fingerprint pattern; and (iv) the blood vessels and other spectrally active structures distributed deeper in the tissue, in a manner similar to vein imaging. As such, embodiments of the invention provide a mechanism for extracting biometric data from multiple sources within the fingertip or other skin site being measured, thereby providing multifactor biometric-sensing applications.

Because of the complex wavelength-dependent properties of skin and underlying tissue, the set of spectral values corresponding to a given image location has spectral characteristics that are well-defined and distinct. These spectral characteristics may be used to classify the multispectral image data on a pixel-by-pixel basis. This assessment may be performed by generating typical tissue spectral qualities from a set of qualified images. For example, the multispectral data shown in FIG. 8 may be reordered as an N×5 matrix, where N is the number of image pixels that contain data from living tissue, rather than from a surrounding region of air. An eigenanalysis or other factor analysis performed on this set matrix produces the representative spectral features of these tissue pixels. The spectra of pixels in a later data set may then be compared to such previously established spectral features using metrics such as Mahalanobis distance and spectral residuals. If more than a small number of image pixels have spectral qualities that are inconsistent with living tissue, then the sample is deemed to be non-genuine and rejected, thus providing a mechanism for incorporating antispoofing methods in the sensor based on determinations of the liveness of the sample.

Similarly, in an embodiment where the sample is a fingertip, the multispectral image pixels are classified as "ridge," "valley," or "other," based on their spectral qualities. This classification can be performed using discriminant analysis methods such as linear discriminant analysis, quadratic discriminant analysis, principle component analysis, neural networks, and others known to those of skill in the art. Since ridge and valley pixels are contiguous on a typical fingertip, in some instances multispectral data from the local neighborhood around the image pixel of interest are used to classify the image pixel. In this way, a conventional fingerprint image is extracted from the sensor for further processing and biometric assessment. The "other" category may indicate image pixels that have spectral qualities that are different than anticipated in a genuine sample. A threshold on the total number of pixels in an image classified as "other" may be set. If this threshold is exceeded, the sample may be determined to be non-genuine and appropriate indications made and actions taken.

Estimations of personal characteristics may be made using the entire datacube or particular portions thereof. For example, appropriate spatial filters may be applied to separate out the lower spatial frequency information that is typically representative of deeper spectrally active structures in the tissue. The fingerprint data may be extracted using similar spatial frequency separation and/or the pixel classification methods disclosed above. The spectral information can be separated from the active portion of the image in the manner discussed above. These three portions of the datacube may then be processed and compared to the correlation data using methods known to one familiar with the art. Based upon the strength of correlating these features in the biometric data, a decision can be made regarding estimates of corresponding anthropometric properties.

3. Examples

There are a number of different useful applications to which the methods and systems of the invention may be put. The specific examples discussed herein are provided only for illustrative purposes and are not intended to be limiting. Each example makes use of an algorithmic relationship between biometric data and a personal characteristic developed as explained in connection with FIG. 1, resulting from the collection of biometric data and corresponding personal-characteristic information from people displaying a diverse range of ages, weight, ethnicities, and work classifications (office work, field work, mechanical work, etc.), as well having different sexes and handedness.

The resulting relationship(s) may be used in law-enforcement contexts, such as where latent prints are retrieved as part of a criminal investigation. Even though the prints may not directly identify a suspect because the prints are not stored in any law-enforcement database, the prints may be analyzed using the methods described above to correlate the prints with a sex, ethnicity, handedness, and approximate age, weight, and work classification for a suspect. The greater the number of personal characteristics that may be defined permits law-enforcement personnel to greatly reduce the size of the suspect pool. Furthermore, this information may be combined with other investigative information collected by law-enforcement personnel that also directs their efforts towards certain individuals as suspects. The additional information derived from the correlation with personal characteristics may make the investigative efforts more efficient and may permit arrests and/or convictions to be made that would otherwise not have been possible.

The algorithmic relationships may also be used in immigration contexts. For example, a foreign national may apply for an entry visa to a country, supplying documentation that identifies the person's age, nationality, sex, work classification, and the like. While some efforts may be made to authenticate this documentation, such authentication may be reinforced by using the correlates to anthropometric properties made available by embodiments of the invention. For instance, a person may present documentation identifying himself as a male of age 30 who has been employed as a manual laborer. A multispectral biometric measurement of the person may be used to derive estimates of anthropometric properties suggesting that the person actually has an age of 38 and has characteristics consistent with an office worker. The discrepancy may then be used to investigate the individual further before granting the visa.

A similar procedure may be used with more active attempts to gain entry to a country fraudulently, such as where spoofing mechanisms are used by a person to hide his identity. This may be the case, for instance, when immigration authorities measure fingerprints for comparison with a database of known terrorists. If a person presenting himself has correlates to anthropometric properties that are inconsistent with his physical appearance, it may indicate the presence of a spoofing mechanism and certainly warrants increased investigation. For example, if a person who appears to be a 30-year-old male of a certain race has correlates to a 70-year-old female of a different race, further investigation is warranted before granting entry to the person.

The algorithmic relationships may also be used in certain commercial contexts, such as by using it as a marketing aid to target advertisements. In many instances, certain demographic groups identified age, sex, and/or race are known to respond differently to different types of advertisements. by A biometric measurement of an individual permits advertising to be targeted according to correlates with anthropometric features so that the advertising expected to be most effective is used.

Still other applications with be evident to those of skill in the art after reading this disclosure.

Thus, having described several embodiments, it will be recognized by those of skill in the art that various modifications, alternative constructions, and equivalents may be used without departing from the spirit of the invention. Accordingly, the above description should not be taken as limiting the scope of the invention, which is defined in the following claims.

What is claimed is:

1. A method for estimating a continuous personal characteristic of an individual, the method comprising:
   collecting a spatio-spectral biometric data measurement from the individual; and
   determining the continuous personal characteristic of the individual by applying an algorithmic relationship between spatio-spectral biometric data measurements and values of the continuous personal characteristic derived from application of an algorithm to a plurality of spatio-spectral biometric data measurements and corresponding collected personal-characteristic values.

2. The method recited in claim 1 wherein the spatio-spectral biometric data measurement and the plurality of spatio-spectral biometric data measurements comprise dermatoglyphic measurements.

3. The method recited in claim 1 wherein collecting the spatio-spectral biometric data measurement comprises:
   illuminating a skin site of the individual with light;
   receiving light scattered from the skin site; and
   deriving a spatio-spectral multispectral image from the received light.

4. The method recited in claim 1 wherein the continuous personal characteristic is selected from the group consisting of age, weight, body-mass index, race, ethnicity, and work classification.

5. The method recited in claim 1 further comprising:
   collecting the plurality of spatio-spectral biometric data measurements and the corresponding personal-characteristic values; and
   applying the algorithm to the plurality of spatio-spectral biometric data measurements and corresponding personal-characteristic values to derive the algorithmic relationship.

6. The method recited in claim 1 further comprising determining a second personal characteristic of the individual by applying a second algorithmic relationship between spatio-spectral biometric data measurements and values of the second personal characteristic derived from application of a second algorithm to the plurality of spatio-spectral biometric data measurements and corresponding collected second personal-characteristic values.

7. The method recited in claim 1 wherein the algorithm comprises a multivariate algorithm.

8. A method for estimating a personal characteristic of an individual, the method comprising:
   illuminating a skin site of the individual with light;
   receiving light scattered from the skin site;
   deriving a spatio-spectral multispectral image from the received light; and
   determining the personal characteristic of the individual by applying an algorithmic relationship between spatio-spectral multispectral images and values of the personal characteristic derived from application of an algorithm to a plurality of spatio-spectral multispectral images and corresponding collected personal-characteristic values.

9. The method recited in claim 8 wherein the personal characteristic is a binary personal characteristic.

10. The method recited in claim 8 wherein the personal characteristic is a continuous personal characteristic.

11. The method recited in claim 8 wherein illuminating the skin site comprises:
    generating the light at a plurality of discrete wavelengths as a plurality of quasimonochromatic beams; and
    directing the generated light to the skin site.

12. The method recited in claim 8 wherein illuminating the skin site comprises:
    generating a broadband beam of light;
    filtering the broadband beam to provide light at a plurality of discrete wavelengths; and
    directing the filtered broadband beam to the skin site.

13. The method recited in claim 8 wherein:
    illuminating the skin site comprises polarizing the light with a first polarization; and
    receiving the light comprises polarizing the received light with a second polarization that is substantially crossed relative to the first polarization.

14. The method recited in claim 8 further comprising:
    collecting the plurality of spatio-spectral multispectral images and the corresponding personal-characteristic values; and
    applying the algorithm to the plurality of spatio-spectral multispectral images and corresponding personal-characteristic values to derive the algorithmic relationship.

15. The method recited in claim 8 further comprising determining a second personal characteristic of the individual by applying a second algorithmic relationship between spatio-spectral multispectral images and values of the second personal characteristic derived from application of a second algorithm to the plurality of spatio-spectral multispectral images and corresponding collected second personal-characteristic values.

16. The method recited in claim 8 wherein the algorithm is a multivariate algorithm.

17. A method for estimating a personal characteristic of an individual, the method comprising:
    collecting a spatio-spectral biometric data measurement from the individual; and
    determining the personal characteristic of the individual by applying an algorithmic relationship between spatio-spectral biometric data measurements and values of the personal characteristic derived from application of a multivariate algorithm to a plurality of spatio-spectral biometric data measurements and corresponding collected personal-characteristic values.

18. The method recited in claim 17 wherein the spatio-spectral biometric data measurement and the plurality of spatio-spectral biometric data measurements comprise dermatoglyphic measurements.

19. The method recited in claim 17 wherein collecting the spatio-spectral biometric data measurement comprises:
    illuminating a skin site of the individual with light;
    receiving light scattered from the skin site; and
    deriving a spatio-spectral multispectral image from the received light.

20. A sensor system comprising:
- an illumination subsystem disposed to provide light to a skin site of an individual;
- a detection subsystem disposed to receive light scattered from the skin site; and
- a computational unit interfaced with the detection subsystem and having:
  - instructions to derive a spatio-spectral multispectral image from the received light; and
  - instructions to determine a personal characteristic of the individual by applying an algorithmic relationship between spatio-spectral multispectral images and values of the personal characteristic derived from application of an algorithm to a plurality of spatio-spectral multispectral images and corresponding collected personal-characteristic values.

21. The sensor system recited in claim 20 wherein the illumination subsystem comprises:
- a light source that provides the light at a plurality of discrete wavelengths; and
- illumination optics to direct the light to the skin site.

22. The sensor system recited in claim 21 wherein the illumination system further comprises a scanner mechanism to scan the light in a specified pattern.

23. The sensor system recited in claim 21 wherein the light source comprises a plurality of quasimonochromatic light sources.

24. The sensor system recited in claim 20 wherein the illumination subsystem comprises:
- a broadband light source; and
- a filter disposed to filter light emitted from the broadband source.

25. The sensor system recited in claim 20 wherein the detection subsystem comprises:
- a light detector; and
- detection optics to direct the received light to the light detector.

26. The sensor system recited in claim 20 wherein:
- the illumination subsystem comprises a first polarizer disposed to encounter the provided light;
- the detection subsystem comprises a second polarizer disposed to encounter the received light; and
- the first and second polarizers are substantially crossed relative to each other.

27. The sensor system recited in claim 20 wherein the computational unit further has instructions to determine a second characteristic of the individual by applying a second algorithmic relationship between spatio-spectral multispectral images and values of the second personal characteristic derived from application of a second algorithm to the plurality of spatio-spectral multispectral images and corresponding collected second personal-characteristic values.

* * * * *